Figure 5:
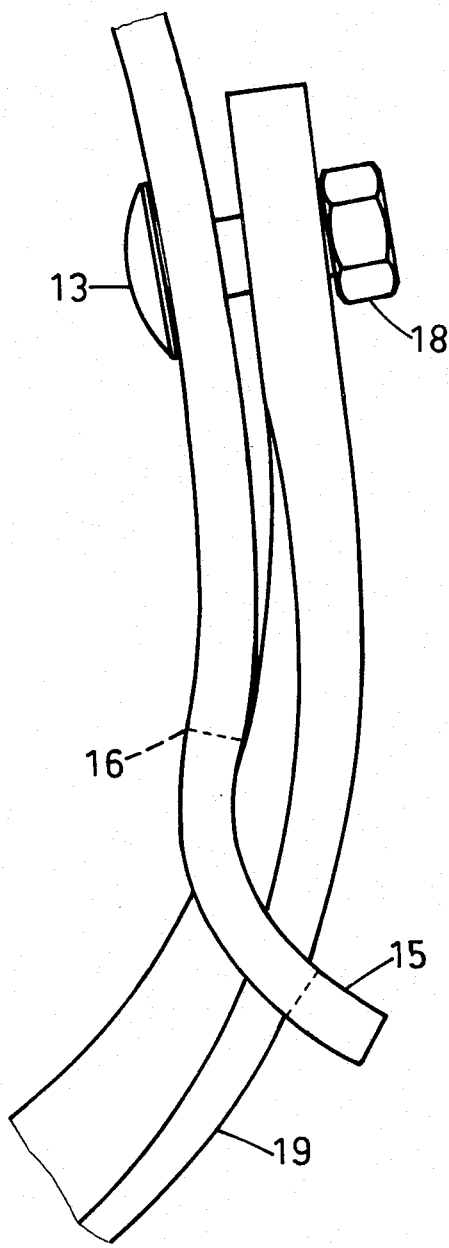

United States Patent [19]
Andersen et al.

[11] 3,921,727
[45] Nov. 25, 1975

[54] HARROW TINE

[75] Inventors: Helge Hojmark Andersen, Soro; Bendix Nielsen, Lynge-Eskildstrup, both of Denmark

[73] Assignee: Kongskilde Maskinfabrik A/S, Soro, Denmark

[22] Filed: Jan. 3, 1974

[21] Appl. No.: 430,591

[52] U.S. Cl. ............................. 172/708; 172/711
[51] Int. Cl.² ........................................ A01B 23/00
[58] Field of Search ............ 172/705, 707, 708, 711

[56] References Cited
UNITED STATES PATENTS

| | | | |
|---|---|---|---|
| 811,517 | 1/1906 | McCune | 172/707 |
| 2,806,336 | 9/1957 | Anderson | 172/708 |
| 3,225,840 | 12/1965 | Anderson | 172/708 |

FOREIGN PATENTS OR APPLICATIONS

| | | | |
|---|---|---|---|
| 1,120,197 | 12/1961 | Germany | 172/708 |
| 946,723 | 1/1964 | United Kingdom | 172/708 |
| 82,669 | 4/1957 | Sweden | 172/708 |

Primary Examiner—Edgar S. Burr
Assistant Examiner—Paul T. Sewell
Attorney, Agent, or Firm—Browdy and Neimark

[57] ABSTRACT

A two part harrow tine comprising a rigid stalk, and a spring to which the stalk is bolted, is provided, the width of the spring being at least twelve times the thickness thereof so that the spring can be secured to the frame of a harrow by two side-by-side bolts disposed through the spring, and a minimum of dampening of the spring is achieved. The part of the spring disposed over the frame when the spring is secured thereto is, as viewed from the side, in a shape of an ellipse or flattened circle, and the spring being shaped to be pre-stressed by the bolting of the stalk to the spring with the stalk disposed through an opening in the spring.

1 Claim, 5 Drawing Figures

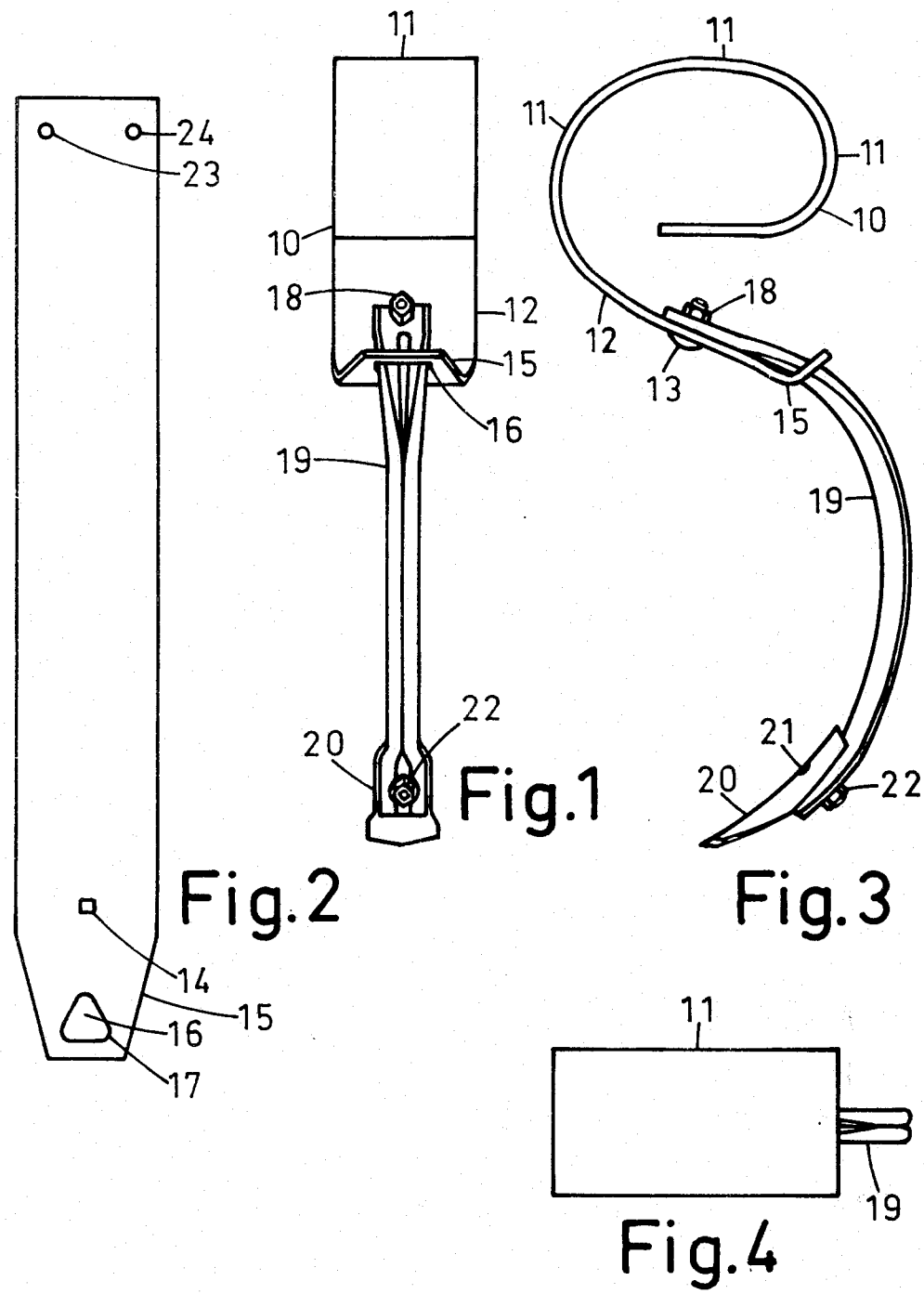

HARROW TINE

The present invention relates to a harrowtine particularly for use in stubble fields, comprising two parts, viz. a rigid stalk and a spring, said parts bolted together.

A good harrowing lessen the costs of chemical treatment of the soil and causes that the application of fertilizers is more effective and besides the structure of the earth is maintained or improved.

Usually harrowtines are made in one piece and with regard to stones are springy so that the tine may pass over an immovable stone.

Harrowtines comprising two parts have not found much use in practice, on the contrary the tendency has been in the opposite direction so that harrowtines are made of one piece. The reason to that harrowtines comprising two parts have not been found a good construction is that no essential advantages seem to be obtained beyond that different stalks of different lengths may be used but it is clear that difficulties may arise in the connection of the two parts.

The harrowtine according to the invention is characterized in that the width of the spring is at least 12 times its thickness, and that the part situated over the frame seen from the side has the shape of an ellipse or a flattened circle. In this way is obtained not only the possibility of replacing stalks by stalks of another shape of length, but there is also obtained a minimum of dampening of the spring which is of very much importance. In use on stubble fields the earth is vibrated due to advantageous vibrations. The earth is vibrated from the roots of the weeds which are pulled to the surface so thTat no nutrient supply reaches the weeds which quicker are dry. The roots are loosened on account of the vibrations and slide up the stalk where they are shaked off in a state where they to a very high extent are free from earth.

Further a long lifetime is obtained by the described shape even in the use on heavy earth with stones. The broad spring has the further advantage that it directly can be bolted to the frame of the harrow because it is possible to place two bolt borings beside each other so that the spring is sufficiently held.

According to the invention the spring may have such a shape relative to the stalk that the spring is pre-stressed when tightening the bolt. In this way a good keeping of the stalk to the spring is obtained. According to the invention there is provided an opening through which opening the stalk is placed so that the stalk is guided and fixed. This improves the steadfastneds of the stalk.

In the accompanying drawings:

FIG. 1 shows a harrowtine according to the invention seen from the back,

FIG. 2 the spring of the tine unwinded,

FIG. 3 the tine seen from the side,

FIG. 4 the same seen from above and

FIG. 5 a detail of the same.

In FIG. 1 10 designates a spring which is made of steel and hardened. The spring 10 has a width at least 12 times the thickness, and the part 11 over the frame of the harrow is shaped as an ellipse or a flattened circle. Under the frame the spring has a part 12 in which is a square opening for a bolt 13. This opening is seen in FIG. 2 and is designated 14. The part 12 is bent to a bending 15, and in this bending is provided a triangular opening with rounded corners 17, see FIG. 2. The bolt 13 is provided with a nut 18 and is designed to fix a stalk 19 which at the bottom is provided with a share 20 which is fixed by means of a bolt 21 and a nut 22.

The stalk 19 is flat at the top and it is here provided with an opening corresponding with the opening 14 in the spring, and beneath that it is bent together so that it easier is pulled through the earth. At the bottom it is made broader and provided with an opening for the bolt 21.

The spring 10 has two openings 23 and 24 serving for the mounting on the harrow frame.

The spring 10 and the stalk 19 are held together by means of the bolt 13 and the nut 18, and the spring 10 has, see FIG. 5, such a shape relative to the stalk, that the spring is pre-stressed when the bolt 13 is tightened. In this way a good keeping of the stalk 19 is obtained and it is guided and fixed in the opening 16 so that it is not even necessary to use a locking disc at the bolt 13 to hinder the nut 18 to be loose.

The tine according to the invention operates in such a way that it is sufficiently springy to pass over embedded stones, and it is nevertheless strong enough to be used with a strong spring on stubble fields. Further the spring may be replaced, and the stalk 19 may also be replaced by a stalk of another type or shape. The different springs vibrate in different ways which is advantageous according to the use.

What is claimed is:

1. A harrow tine for use with a harrow comprising:
   a rigid stalk; and
   a spring bolted to said stalk and having a section mounted on and passing around a substantial portion of said harrow, said spring having a width at least twelve times its thickness and being provided with an opening through which said stalk is passed, the section of said spring mounted on and passing around a substantial portion of said harrow having substantially an elliptical shape, said spring being curved so that when said spring is bolted to said stalk the spring is under a tension, whereby a sure connection between said spring and said stalk is maintained.

\* \* \* \* \*